US012581477B2

(12) United States Patent
Li et al.

(10) Patent No.: US 12,581,477 B2
(45) Date of Patent: Mar. 17, 2026

(54) DATA TRANSMISSION METHOD AND APPARATUS, ELECTRONIC DEVICE, AND STORAGE MEDIUM

(71) Applicant: ZTE CORPORATION, Shenzhen (CN)

(72) Inventors: Zonghui Li, Shenzhen (CN); Jinghai Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 328 days.

(21) Appl. No.: 18/549,420

(22) PCT Filed: Jan. 29, 2022

(86) PCT No.: PCT/CN2022/074958
§ 371 (c)(1),
(2) Date: Sep. 7, 2023

(87) PCT Pub. No.: WO2022/193860
PCT Pub. Date: Sep. 22, 2022

(65) Prior Publication Data
US 2024/0306141 A1     Sep. 12, 2024

(30) Foreign Application Priority Data

Mar. 15, 2021     (CN) ......................... 202110276013.1

(51) Int. Cl.
*H04W 72/12* (2023.01)
*H04W 72/50* (2023.01)
(52) U.S. Cl.
CPC ......... *H04W 72/12* (2013.01); *H04W 72/535* (2023.01)

(58) Field of Classification Search
CPC .... H04W 72/12; H04W 72/535; H04L 45/38; H04L 45/74; H04L 47/22; H04L 47/24;
(Continued)

(56) References Cited

U.S. PATENT DOCUMENTS

2005/0058149 A1     3/2005   Howe
2015/0103828 A1     4/2015   Chandhoke et al.
(Continued)

FOREIGN PATENT DOCUMENTS

CN          101447934 A     6/2009
CN          108737003 A     11/2018
(Continued)

OTHER PUBLICATIONS

Japan Patent Office. First Office Action and Search Report for JP Application No. 2023-541028 and English translation, mailed Aug. 5, 2024, pp. 1-16.
(Continued)

*Primary Examiner* — Mohamed A Kamara
(74) *Attorney, Agent, or Firm* — Vivacqua Crane, PLLC

(57) ABSTRACT

A data transmission method and apparatus, an electronic device, and a storage medium are disclosed. The data transmission method may include: acquiring current time information (S1100); acquiring message attribute information of a current traffic flow to be sent (S1200); generating a transmission control policy based on the current time information and the message attribute information (S1300); and controlling traffic flow transmission in time-sensitive networking based on the transmission control policy (S1400).

20 Claims, 5 Drawing Sheets

(58) Field of Classification Search
CPC ......... H04L 47/28; H04L 47/36; H04L 47/56; H04L 41/0894; H04L 41/0893; H04L 47/2416; H04L 47/2433; H04L 47/2441; H04L 47/2483
See application file for complete search history.

(56) References Cited

U.S. PATENT DOCUMENTS

| | | | |
|---|---|---|---|
| 2017/0331748 A1 | 11/2017 | Mangin | |
| 2020/0014778 A1 | 1/2020 | Mangin | |
| 2020/0120536 A1* | 4/2020 | Prakash | H04W 72/12 |
| 2020/0163082 A1 | 5/2020 | Yamaura et al. | |
| 2020/0259755 A1 | 8/2020 | Wang et al. | |
| 2021/0227424 A1* | 7/2021 | Wang | H04L 47/24 |
| 2021/0274375 A1 | 9/2021 | Li et al. | |
| 2021/0274418 A1* | 9/2021 | Zhou | H04W 80/02 |

FOREIGN PATENT DOCUMENTS

| | | |
|---|---|---|
| CN | 109787919 A | 5/2019 |
| CN | 111200846 A | 5/2020 |
| CN | 112019392 A | 12/2020 |
| CN | 112260957 A | 1/2021 |
| JP | 2017532870 A | 11/2017 |
| JP | 2020507245 A | 3/2020 |
| JP | 2020088514 A | 6/2020 |

OTHER PUBLICATIONS

Winkel, L., and Teener, M. "Joint Tutorial: IEEE 802.3br TF Interspersing express traffic (IET) and IEEE 802.1 Time sensitive Networking (TSN)," Joint IEEE 802.1 / IEEE 802.3 Tutorial #2, Berlin, Germany, Mar. 2015, pp. 1-61.
Japan Patent Office. Notice of Reasons for Refusal for JP Application No. 2023-541028 and English translation, mailed Feb. 13, 2025, pp. 1-22.
European Patent Office. Extended European Search Report for EP Application No. 22770219.8, mailed Dec. 23, 2024, pp. 1-8.
International Searching Authority. International Search Report and Written Opinion for PCT Application No. PCT/CN2022/074958 and English translation, mailed Apr. 27, 2022, pp. 1-10.

* cited by examiner

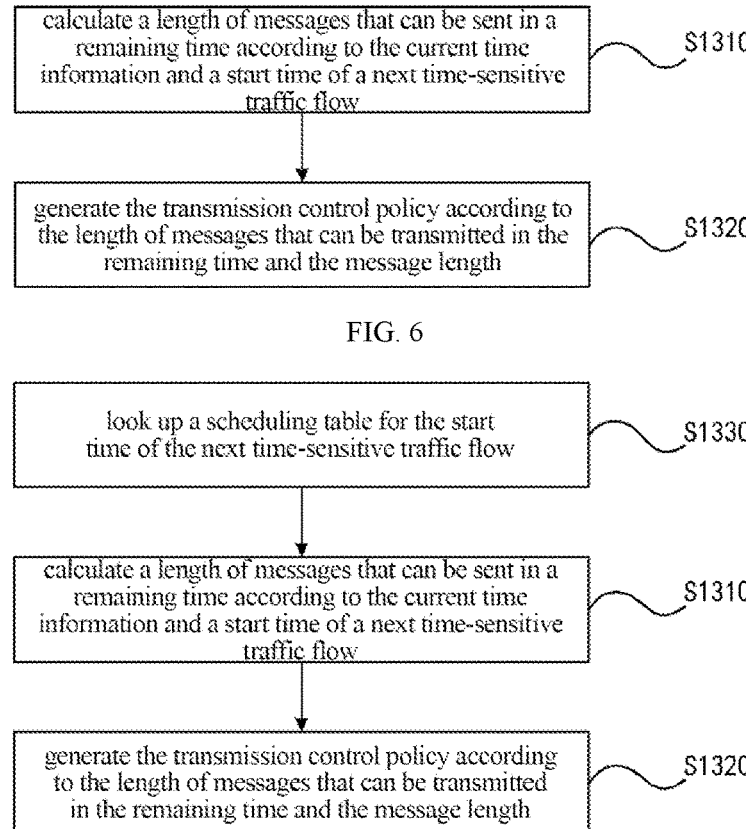
FIG. 6
FIG. 7
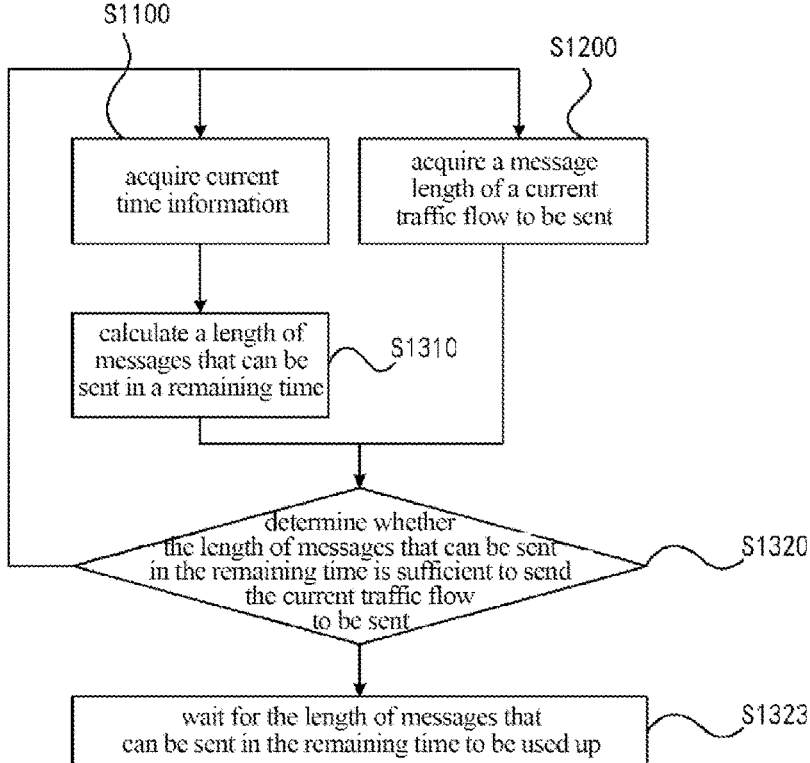
FIG. 8

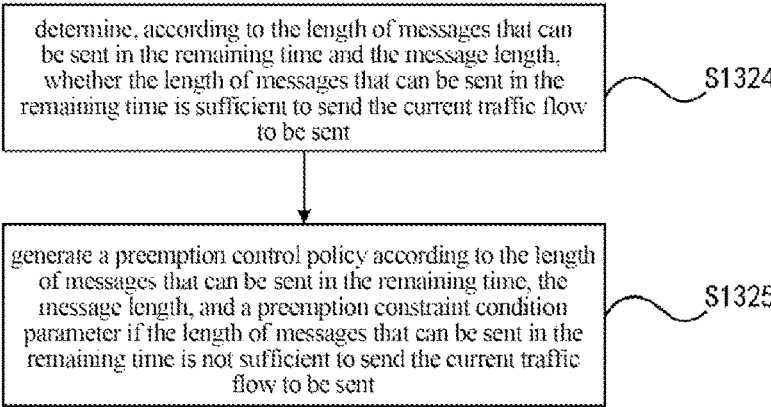

determine, according to the length of messages that can be sent in the remaining time and the message length, whether the length of messages that can be sent in the remaining time is sufficient to send the current traffic flow to be sent ⌇ S1324 generate a preemption control policy according to the length of messages that can be sent in the remaining time, the message length, and a preemption constraint condition parameter if the length of messages that can be sent in the remaining time is not sufficient to send the current traffic flow to be sent ⌇ S1325

FIG. 10

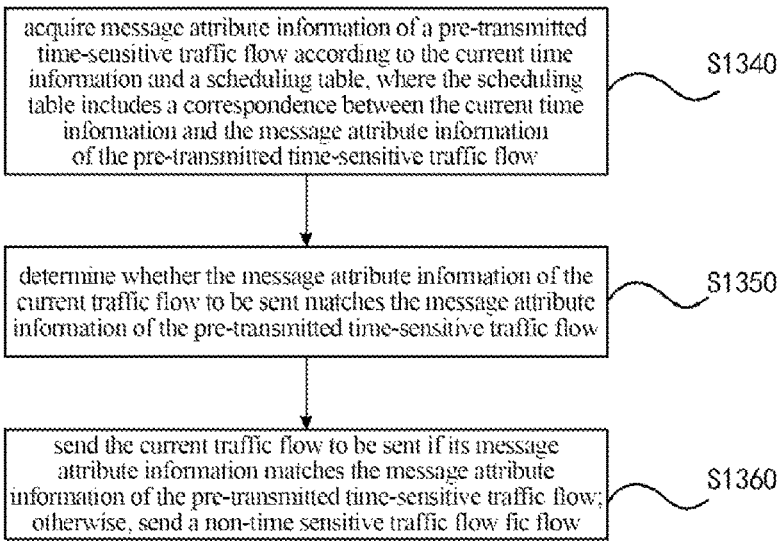

acquire message attribute information of a pre-transmitted time-sensitive traffic flow according to the current time information and a scheduling table, where the scheduling table includes a correspondence between the current time information and the message attribute information of the pre-transmitted time-sensitive traffic flow ⌇ S1340 determine whether the message attribute information of the current traffic flow to be sent matches the message attribute information of the pre-transmitted time-sensitive traffic flow ⌇ S1350 send the current traffic flow to be sent if its message attribute information matches the message attribute information of the pre-transmitted time-sensitive traffic flow; otherwise, send a non-time sensitive traffic flow fic flow ⌇ S1360

FIG. 11

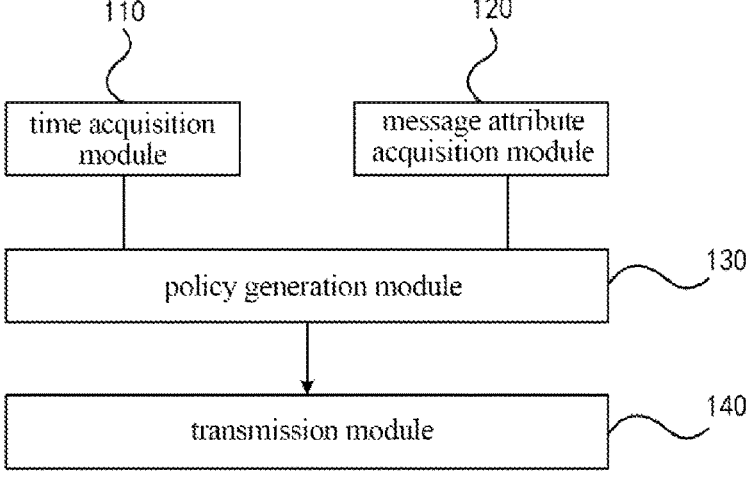

110   120

| time acquisition module | message attribute acquisition module |
| --- | --- | policy generation module   130 transmission module   140

FIG. 12

DATA TRANSMISSION METHOD AND APPARATUS, ELECTRONIC DEVICE, AND STORAGE MEDIUM

CROSS-REFERENCE TO RELATED APPLICATION

This application is a national stage filing under 35 U.S.C. § 371 of international application number PCT/CN2022/074958, filed Jan. 29, 2022, which claims priority to Chinese patent application No. 202110276013.1 filed Mar. 15, 2021. The entire contents of these applications are incorporated herein by reference in their entirety.

TECHNICAL FIELD

Embodiments of the present disclosure relate to the technical field of communication, and in particular, to a data transmission method and apparatus, an electronic device, and a storage medium.

BACKGROUND

Time-Sensitive Networking (TSN) is a standard developed by the TSN Working Group of the Institute of Electrical and Electronics Engineers (IEEE) 802.1. This standard mainly defines a mechanism of time-sensitive transmission over Ethernet. The TSN technology pays special attention to deterministic latency, low latency, and high availability of transmission.

In order to ensure the real-time and deterministic transmission of time-sensitive traffic flows, such as time-triggered (TT) traffic flows, a transmission control policy (such as a bandwidth resource reservation policy) is generally used to control traffic data. However, the transmission control policy in related technical schemes is likely to cause a bandwidth waste.

SUMMARY

A general summary of the subject matter set forth in the description is provided below. This summary is not intended to limit the scope of protection of the claims.

Embodiments of the present disclosure provide a data transmission method and apparatus, an electronic device, and a storage medium.

In accordance with a first aspect of the present disclosure, a data transmission method is provided. The method may include: acquiring current time information; acquiring message attribute information of a current traffic flow to be sent; generating a transmission control policy based on the current time information and the message attribute information; and controlling traffic flow transmission in time-sensitive networking based on the transmission control policy.

In accordance with a second aspect of the present disclosure, a data transmission apparatus is provided. The apparatus may include: a time acquisition module, configured to acquire current time information; a message attribute acquisition module, configured to acquire message attribute information of a current traffic flow to be sent; a policy generation module, configured to generate a transmission control policy based on the current time information and the message attribute information; and a transmission module, configured to control traffic flow transmission in time-sensitive networking based on the transmission control policy.

In accordance with a third aspect of the present disclosure, an electronic device is provided. The electronic device may include: a memory, a processor, and a computer program stored in the memory and executable by the processor. The computer program, when executed by the processor, causes the processor to implement the data transmission method as described in the first aspect.

In accordance with a fourth aspect of the present disclosure, provided is a computer-readable storage medium, storing computer-executable instructions which, when executed by a processor, cause the processor to implement the data transmission method as described in the first aspect.

BRIEF DESCRIPTION OF DRAWINGS

In order to describe the technical schemes of the embodiments of the present disclosure clearly, the following briefly introduces the accompanying drawings required for describing the embodiments or related technologies. Apparently, the accompanying drawings in the following description show only some of the embodiments of the present disclosure, and those having ordinary skills in the art may still derive other drawings from these accompanying drawings without creative efforts.

FIG. 6 is a schematic flowchart of a data transmission method according to another embodiment of the present disclosure;

FIG. 7 is a schematic flowchart of a data transmission method according to another embodiment of the present disclosure;

FIG. 8 is a schematic flowchart of a data transmission method according to another embodiment of the present disclosure;

FIG. 10 is a schematic flowchart of a data transmission method according to another embodiment of the present disclosure;

FIG. 11 is a schematic flowchart of a data transmission method according to another embodiment of the present disclosure; and FIG. 12 is a schematic structural diagram of a data transmission apparatus according to an embodiment of the present disclosure.

DETAILED DESCRIPTION

Figure 1:
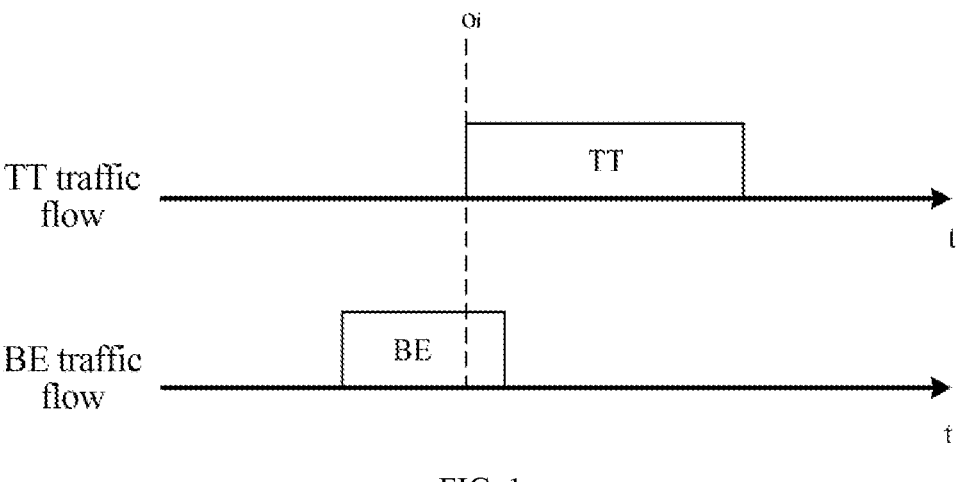
FIG. 1 is a schematic diagram illustrating a timing principle of a conflict between TSN traffic flows.

For purposes of illustration and not limitation, specific details such as particular system structures and techniques are set forth in the following description to provide a thorough understanding of the embodiments of the present disclosure. However, it should be appreciated by those having ordinary skills in the art that the embodiments of the present disclosure can be realized in other embodiments without these specific details. In some other cases, detailed description of well-known systems, apparatuses, circuits, and methods are omitted, so as not to obscure the description of the embodiments of the present disclosure with unnecessary details.

It should be noted that, logical orders have been shown in the flowcharts, in some cases, the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

It should also be understood that reference to "an embodiment", "some embodiments", or the like described in the description of the embodiments of the present disclosure means that particular characteristics, structures, or features described in connection with the embodiment are included in one or more embodiments of the present disclosure. Therefore, phrases such as "in an embodiment", "in some embodiments", and "in some other embodiments" appearing throughout the description do not necessarily all refer to the same embodiment, but mean "one or more embodiments, not all embodiments", unless otherwise particularly stated. The terms such as "include", "comprise", "have" and their variants all mean "including but not limited to", unless otherwise particularly stated.

Time-Sensitive Networking (TSN) has a wide application prospect. The TSN introduces a time-triggered transmission mechanism to schedule the precise transmission time of data (such as industrial control data) in a device (such as a switch). A real-time traffic flow is transmitted at a precise time point, and therefore is called a time-sensitive traffic flow. A non-real-time traffic flow is transmitted in a gap between time-sensitive traffic flows, and therefore is called a non-time-sensitive traffic flow.

In order to ensure the real-time and deterministic transmission of time-sensitive traffic flows, a transmission control policy is generally used to control traffic data. However, the transmission control policy in related technical schemes is likely to cause a bandwidth waste. For example, there are the following three cases.

(1) A reserved bandwidth for time-sensitive traffic flows cannot be utilized. According to the transmission control policy in related technical schemes, a bandwidth is reserved for time-sensitive traffic flows to realize the precise transmission of the real-time traffic flows. However, when there is no real-time traffic flow, the reserved bandwidth is still kept for a window time according to the transmission control policy in related technical schemes, resulting in a bandwidth waste. For example, assuming $f_1 \ldots f_m$ are missing real-time traffic flows, a sum of reserved losses caused by the missing real-time traffic flows is:

$$\text{ReservedLoss} = \sum_{i=1}^{m} \frac{f_i \cdot \text{length}}{f_i \cdot \text{period}}$$

where $f_i \cdot$length and $f_i \cdot$period represent a message length and a sending period of a real-time traffic flow $f_i$ respectively.

Figure 2:
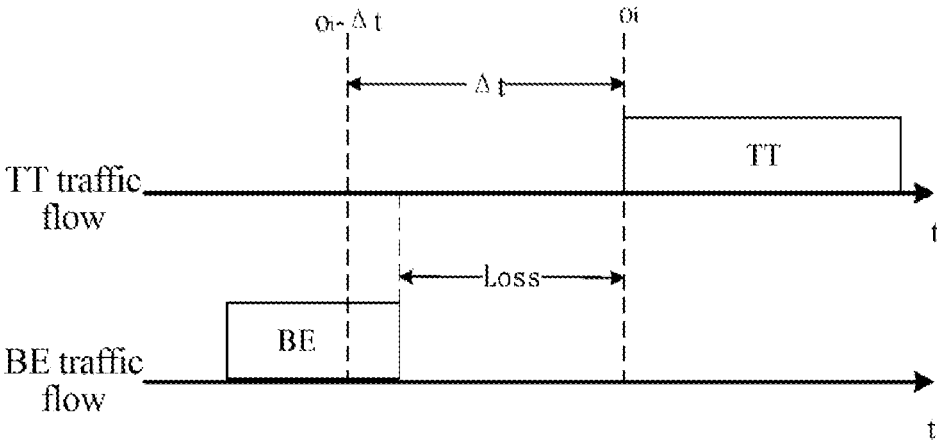
FIG. 2 is a schematic diagram illustrating a timing principle of a TSN guard band policy.

(2) A guard band policy in the related technical schemes causes a great bandwidth waste. As shown in FIG. 1, at a start time $o_i$ of a time-sensitive traffic flow, a non-time-sensitive traffic flow is being sent. In order to resolve this conflict, the guard band policy is applied. As shown in FIG. 2, a guard time $\Delta t$ is set before the start time $o_i$ of the time-sensitive traffic flow. To be specific, a notification is sent at $o_i - \Delta t$ to close a transmission control gate for a non-time-sensitive traffic flow queue. This guard time $\Delta t$ is sufficient to ensure that the sending of messages of any non-time-sensitive traffic flow being sent can be completed, thereby ensuring a conflict-free transmission of the time-sensitive traffic flow and the non-time-sensitive traffic flow. Therefore, the guard time $\Delta t$ is called a guard band. The length of the guard time is generally a maximum message length of the non-time-sensitive traffic flow. A bandwidth loss Loss is illustrated in FIG. 2.

Figure 3:
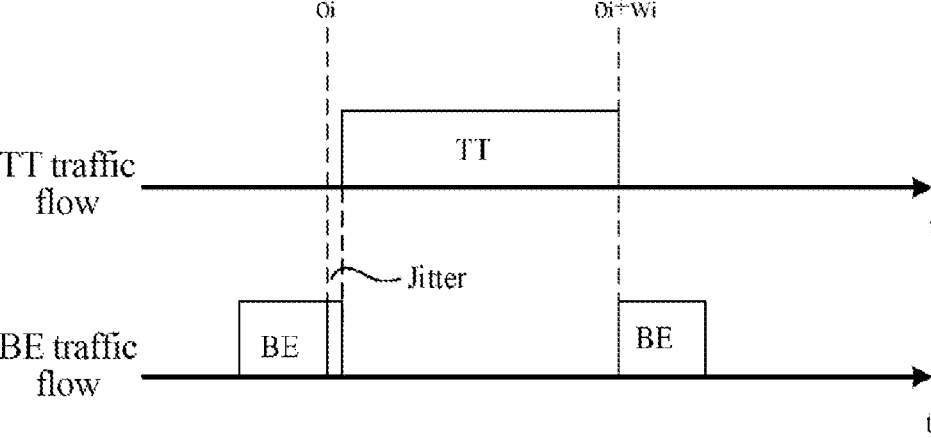
FIG. 3 is a schematic diagram illustrating a timing principle of a TSN frame preemption policy.

(3) A preemption policy in the related technical schemes introduces an extra latency jitter, which destroys the deterministic transmission of time-sensitive traffic flows. As shown in FIG. 3, when a time-sensitive traffic flow conflicts with a non-time-sensitive traffic flow, a message of the non-time-sensitive traffic flow is truncated at a moment when the time-sensitive traffic flow is to be sent and is padded with a 4-byte CRC check code to end the sending of the non-time-sensitive traffic flow at first. Then, the transmission of the time-sensitive traffic flow begins. Finally, the remaining part of the truncated non-time-sensitive traffic flow is sent at $(o_i + w_i)$ when the sending of the time-sensitive traffic flow is completed. Each preemption introduces a 4-byte latency jitter. Moreover, in order to ensure that the truncated message is a valid Ethernet frame, the preemption policy requires that the length of each of the two parts of the message obtained after truncation should be greater than a minimum Ethernet frame length of at least 64 bytes. Therefore, a minimum frame length of a truncatable Ethernet message is 60+64=124 bytes. Therefore, when the message length is less than 124 bytes, the jitter introduced is the message length of the whole time-insensitive traffic flow in a worst case. In addition, because the message is truncated, i.e., an original message is divided into two messages for transmission, additional data to be transmitted includes padded CRC check code (4 bytes), interpacket gap (IPG) (12 bytes), preamble (6 bytes), Start mPacket Delimiter (SMD) (1 byte), and FRAG_COUNT (1 byte), totaling 24 bytes, which are the bandwidth loss caused by the frame preemption policy.

In view of the above, embodiments of the present disclosure provide a data transmission method and apparatus, an electronic device, and a storage medium. In the embodiments of the present disclosure, a transmission control policy is generated based on current time information and message attribute information of a current traffic flow to be sent, to control transmission of traffic flows, thereby effectively improving the bandwidth utilization rate without affecting the real-time and deterministic transmission of time-sensitive traffic flows. This can effectively improve the bandwidth utilization rate without affecting the real-time and deterministic transmission of time-sensitive traffic flows.

The data transmission method provided by an embodiment of the present disclosure may be executed in a processor, which may include one or more processing units. Different processing units may be independent devices, or may be integrated in one or more devices.

The embodiments of the present disclosure will be further described in detail below in conjunction with the accompanying drawings.

Figure 4:
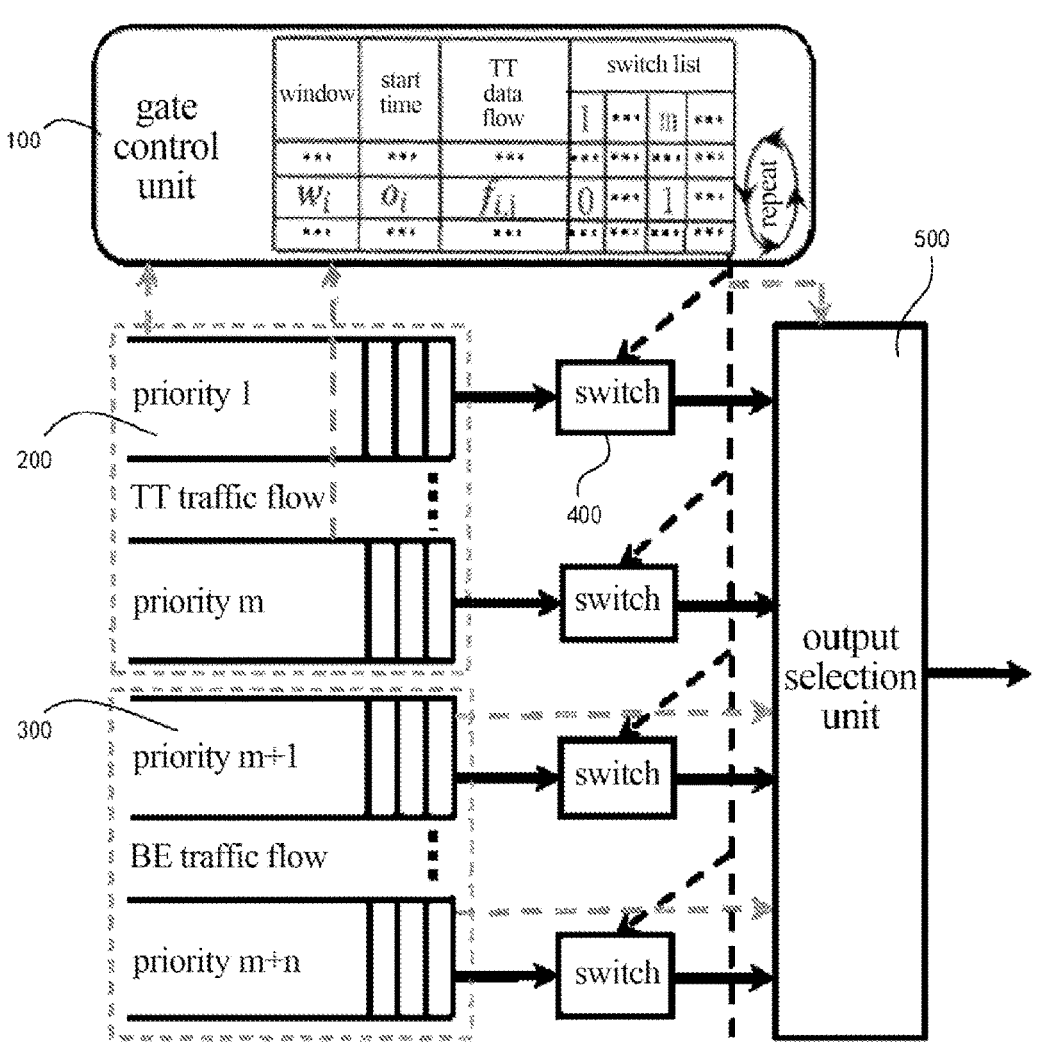
FIG. 4 is a schematic diagram of a software system architecture configured to execute a data transmission method according to the present disclosure.

As shown in FIG. 4, FIG. 4 is a schematic diagram of a software system architecture configured to execute a data transmission method according to an embodiment of the present disclosure. In the example of FIG. 4, the system architecture is a time-aware shaper (TAS) system architecture based on the TSN standard 802.1 Qbv, including a gate control unit 100, at least one time-sensitive traffic flow queue 200, at least one non-time-sensitive traffic flow queue 300, a plurality of queue switches 400, and an output selection unit 500. For example, the TSN can schedule a precise transmission time of data (such as industrial control data) in a device (such as a switch), and can convert the scheduling result into configuration information of the device (such as the switch), i.e., a scheduling table. The TSN standard 802.1 Qbv defines a time-aware shaper (TAS) to interpret and execute the scheduling table. Entries of the scheduling table usually include window $w_i$ (i.e., window duration, hereinafter referred to as message length), start time $o_i$ (i.e., window start time), data flows $f_{i,1}$ ... $f_{i,j}$ (i.e., time-sensitive traffic flows to be transmitted during the window duration), and queue switch 400 status list (i.e., switch list, also known as Gate Control List (GCL), consisting of 0 or 1, with 0 indicating on and 1 indicating off). The scheduling table is executed in sequence according to an order of the window start time, and the GCL is configured to control the control gates (i.e., queue switches 400) corresponding to different queues. The control gate corresponding to the data flow is turned on at the start time of the window, and at the same time the switches of other queues are turned off, to realize the precise transmission of the time-sensitive traffic flow at the scheduled time point. After the sending of the time-sensitive traffic flow is completed, the corresponding control gate is closed by control based on the GCL, and at the same time the switches of other queues are turned on, to transmit a non-time-sensitive traffic flow. When execution of the last entry in the scheduling table is completed, the above process is repeated cyclically starting from the first entry.

The gate control unit 100 is configured to parse the scheduling table and output an instruction based on the scheduling table to control statuses of the queue switches 400, in order to control a traffic flow transmission in a message queue. The scheduling table may be a scheduling table stored locally or may be a scheduling table acquired remotely, which is not limited in the present disclosure. An output end of the gate control unit 100 is respectively connected to input ends of the queue switches 400 to output an instruction to control the statuses of the queue switches 400. In some embodiments, the output end of the gate control unit 100 is connected to an input end of the output selection unit 500 to provide scheduling table information to the output selection unit 500, so that the output selection unit 500 generates a transmission control policy based on the scheduling table information. For example, the gate control unit 100 is configured to provide an execution start time of a scheduling entry to be executed to the output selection unit 500, so that the output selection unit 500 generates a remaining-time-based transmission policy and/or an optimized preemption control policy based on the execution start time of the scheduling entry to be executed. In some other embodiments, an input end of the gate control unit 100 is connected to an output end of a time-sensitive traffic flow queue 200, to receive message attribute information of a current traffic flow to be sent from the time-sensitive traffic flow queue 200, in order to generate a transmission control policy based on the scheduling table information and the message attribute information of the current traffic flow to be sent. For example, the gate control unit 100 is configured to receive the message attribute information of the current traffic flow to be sent from the time-sensitive traffic flow queue 200, and determine whether the message attribute information of the current traffic flow to be sent matches message attribute information of a pre-transmitted time-sensitive traffic flow, in order to generate a reserved bandwidth reuse policy.

The time-sensitive traffic flow queue 200 is configured to buffer time-sensitive traffic flows. There may be a plurality of time-sensitive traffic flow queues 200, for which different priorities may be set. As shown in FIG. 4, m TT traffic flow queues have priorities from priority 1 to priority m. In the time-sensitive traffic flow queue 200, a time sensitive traffic flow at the head of the queue is a queue head message, which is sent preferentially. In some embodiments, an output end of each of the time-sensitive traffic flow queues 200 is connected to the output selection unit 500 through a queue switch 400 (control gate), to send the time-sensitive traffic flow through the queue switch 400 and the output selection unit 500. In some embodiments, the output end of each of the time-sensitive traffic flow queues 200 is connected to the input end of the gate control unit 100 to provide the message attribute information of the current traffic flow to be sent to the gate control unit 100, so that the gate control unit 100 generates a transmission control policy based on the scheduling table information and the message attribute information of the current traffic flow to be sent. For example, the time-sensitive traffic flow queue 200 is configured to provide ID information of the current traffic flow to be sent, so that the gate control unit 100 determines whether the ID information of the current traffic flow to be sent matches ID information of the pre-transmitted time sensitive traffic flow, to generate a reserved bandwidth reuse policy.

The non-time-sensitive traffic flow queue 300 is configured to buffer non-time-sensitive traffic flows. There may be a plurality of non-time-sensitive traffic flow queues 300, and different priorities may be set for the plurality of non-time-sensitive traffic flow queues 300. As shown in FIG. 4, n BE traffic flow queues have priorities from priority m+1 to priority m+n. In the non-time-sensitive traffic flow queue 300, a non-time-sensitive traffic flow at the head of the queue is a queue head message which is sent preferentially. In some embodiments, an output end of each of the non-time-sensitive traffic flow queues 300 is connected to the output selection unit 500 through a queue switch 400 (control gate), to send the non-time-sensitive traffic flow through the queue switch 400 and the output selection unit 500. In some embodiments, the output end of each of the non-time-sensitive traffic flow queues 300 is connected to the input end of the output selection unit 500 to provide the message attribute information of the current traffic flow to be sent to the output selection unit 500, so that the output selection unit 500 generates a transmission control policy based on the scheduling table information and the message attribute information of the current traffic flow to be sent. For example, the non-time-sensitive traffic flow queue 300 provides a message length of the current traffic flow to be sent to the output selection unit 500, so that the output selection unit 500 generates a remaining-time-based transmission policy and/or an optimized preemption control policy based on the message length of the current traffic flow to be sent and the execution start time of the scheduling entry to be executed.

The queue switches 400 may also be referred to as control gates. The number of the queue switches 400 matches the number of traffic flow queues, and each of the queue switches 400 is connected between a traffic flow queue and the output selection unit 500. A control input end of the queue switch 400 is connected to the output end of the gate control unit 100, to switch a status of the switch based on an instruction from the gate control unit 100, in order to determine whether to send the current traffic flow to be sent of the corresponding traffic flow queue. The traffic flow queue may be a time-sensitive traffic flow queue 200 or a non-time-sensitive traffic flow queue 300.

An input end of the output selection unit is connected to the output end of each queue, and the output selection unit 500 is configured to control sending of a traffic flow. The traffic flow may be a time-sensitive traffic flow or a non-time-sensitive traffic flow. In some embodiments, the input end of the output selection unit 500 is connected to the output end of the gate control unit 100, to acquire the scheduling table information from the gate control unit 100. Another input end of the output selection unit 500 is connected to the output end of the non-time-sensitive traffic flow queue 300, to acquire the message length of the current traffic flow to be sent from the non-time-sensitive traffic flow queue 300. The output selection unit 500 may be configured to generate a remaining-time-based transmission policy and/or an optimized preemption control policy based on the message length of the current traffic flow to be sent and the execution start time of the scheduling entry to be executed.

The system architecture and application scenarios described in the embodiments of the present disclosure are for the purpose of illustrating the technical schemes of the embodiments of the present disclosure clearly, and do not constitute a limitation on the technical schemes provided in the embodiments of the present disclosure. Those having ordinary skills in the art may know that with the evolution of the system architecture and the emergence of new application scenarios, the technical schemes provided in the embodiments of the present disclosure are also applicable to similar technical problems.

Those having ordinary skills in the art can understand that the system architecture shown in FIG. 4 do not constitute a limitation on the embodiments of the present disclosure, and more or less components than those shown in the figure may be included, or some components may be combined, or a different component arrangement may be used.

In the system architecture shown in FIG. 4, each component may call a data transmission program stored therein to execute the data transmission method.

Based on the above system architecture, various embodiments of the data transmission method of the present disclosure are proposed. It should be noted that in the following embodiments, a time-sensitive traffic flow may be a Time-Triggered (TT) traffic flow and the like, and a non-time-sensitive traffic flow may be a Best-Effort (BE) traffic flow, a Rate-Constrained (RC) traffic flow, etc. The following embodiments are described using an example where the time-sensitive traffic flow is a TT traffic flow and the non-time-sensitive traffic flow is a BE traffic flow.

Figure 5:
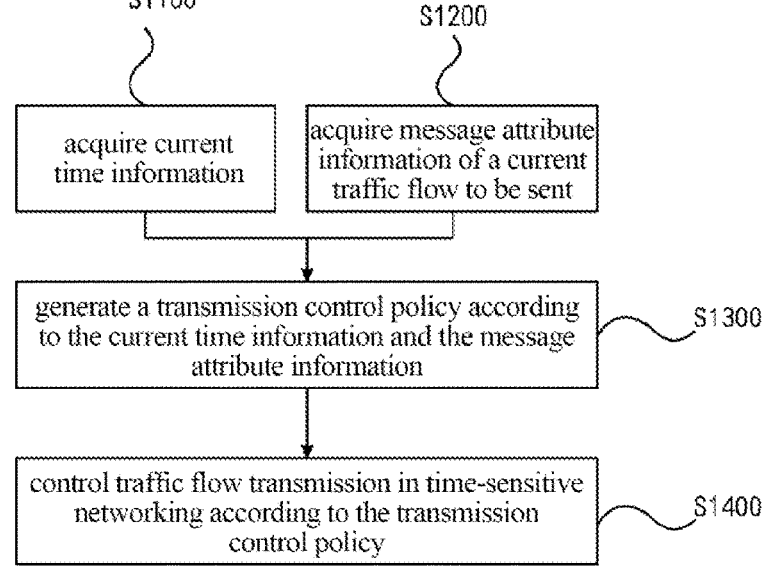
FIG. 5 is a schematic flowchart of a data transmission method according to an embodiment of the present disclosure.

As shown in FIG. 5, an embodiment provides a data transmission method, including the following steps.

At a step S1100, current time information is acquired.

At a step S1200, message attribute information of a current traffic flow to be sent is acquired.

At a step S1300, a transmission control policy is generated based on the current time information and the message attribute information.

At a step S1400, traffic flow transmission in time-sensitive networking is controlled based on the transmission control policy.

In some embodiments, in order to solve the problems of bandwidth waste and latency jitter in the hybrid transmission of time-sensitive traffic flows and non-time-sensitive traffic flows in related technologies, a predictive hybrid transmission control policy for TSN is provided based on the current time information and the message attribute information of the current traffic flow to be sent. The predictive hybrid transmission control policy (transmission control policy for short) includes, but not limited to, one or more of a reserved bandwidth reuse policy, a remaining-time-based transmission policy, and an optimized preemption control policy. Detail descriptions will be given in the following embodiments.

In some embodiments, the current traffic flow to be sent may be a time-sensitive traffic flow or a non-time-sensitive traffic flow. The time-sensitive traffic flow may be a TT traffic flow, etc. The non-time-sensitive traffic flow may be a BE traffic flow, a RC traffic flow, etc. The message attribute information may include one or more of traffic flow ID information, a message length and the like of a traffic flow message.

In the embodiments of the present disclosure, a transmission control policy is generated based on current time information and message attribute information of a current traffic flow to be sent, to control transmission of traffic flows, thereby effectively improving the bandwidth utilization rate without affecting the real-time and deterministic transmission of time-sensitive traffic flows. This can effectively improve the bandwidth utilization rate without affecting the real-time and deterministic transmission of time-sensitive traffic flows.

In some embodiments, the current traffic flow to be sent is a non-time-sensitive traffic flow, and the message attribute information includes a message length.

As shown in FIG. 6, in some embodiments, generating a transmission control policy based on the current time information and the message attribute information in the step S1300 includes the following steps.

At a step of S1310, a length of messages that can be sent in a remaining time is calculated based on the current time information and a start time of a next time-sensitive traffic flow.

At a step S1320, the transmission control policy is generated based on the length of messages that can be sent in the remaining time and the message length.

In some embodiments, in the step S1310, the length of messages that can be sent in the remaining time may be a difference between a start time $o_i$ of the next time-sensitive traffic flow (e.g., a time-sensitive traffic flow to be executed in the scheduling table) and the current time information $t_n$, i.e., $\Delta t = o_i - t_n$. For example, if the current time information is a moment at which the sending of a previous time-sensitive traffic flow is completed, the length of messages that can be sent in the remaining time, $\Delta t$, is a sending gap between two time-sensitive traffic flows, i.e., $\Delta t = o_i - (o_{i-1} + w_{i-1})$, where $o_{i-1}$ represents a start time of the previous time-sensitive traffic flow (e.g., a time-sensitive traffic flow that has just been executed in the scheduling table); $w_{i-1}$ represents a duration of the previous time-sensitive traffic flow (e.g., the time-sensitive traffic flow that has just been executed in the scheduling table), i.e., a message length; and $o_{i-1} + w_{i-1}$ represents the moment at which the sending of the previous time-sensitive traffic flow is completed, i.e., the current time information $t_n$. If the current time information is the moment at which the sending of the previous time-sensitive traffic flow is completed, the length of messages that can be sent in the remaining time, $\Delta t$, can be calculated based on a difference between the start time $o_i$ of the next time sensitive traffic flow (e.g., the time sensitive traffic flow to be executed in the scheduling table) and the current time information $t_n$, i.e., $\Delta t = o_i - t_n$. An updated value of the length of messages that can be sent in the remaining time, $\Delta t$, may further be iteratively calculated based on $\Delta t_n = \Delta t_{n-1} - BE_{n-1} \cdot length$, where $\Delta t_n$ represents the updated length of messages that can be sent in the remaining time, $\Delta t_{n-1}$ represents the length of messages that can be sent in the remaining time that is calculated last time, and $BE \cdot length_{n-1}$ represents the moment at which the sending of the previous time-sensitive traffic flow is completed, i.e., the current time information $t_n$. It should be noted that in some embodiments, a sending status of the traffic flow (time-sensitive traffic flow or non-time-sensitive traffic flow) corresponding to the current time information is idle.

In some embodiments, at the step S1320, the transmission control policy may be generated based on the length of messages that can be sent in the remaining time $\Delta t$ and the message length BE·length. For example, the length of messages that can be sent in the remaining time $\Delta t$ and the message length BE·length may be compared to determine whether the length of messages that can be sent in the remaining time $\Delta t$ is sufficient to send the current traffic flow to be sent.

In some embodiments, the steps S1100 to S1400 may be executed in the output selection unit in the software system architecture shown in FIG. 4.

As shown in FIG. 7, in some embodiments, prior to calculating a length of messages that can be sent in a remaining time based on the current time information and a start time of a next time-sensitive traffic flow, the method further includes a following.

At a step S1330, a scheduling table is looked up for the start time of the next time-sensitive traffic flow.

In some embodiments, the start time $o_i$ of the next time-sensitive traffic flow may be obtained by looking up the scheduling table. For example, the steps S1100 to S1400 may be executed in the output selection unit in the software system architecture shown in FIG. 4. The output selection unit may be configured to acquire scheduling table information in the gate control unit through a communication connection with the gate control unit, in order to acquire the start time $o_i$ of the next time-sensitive traffic flow.

Figure 9:
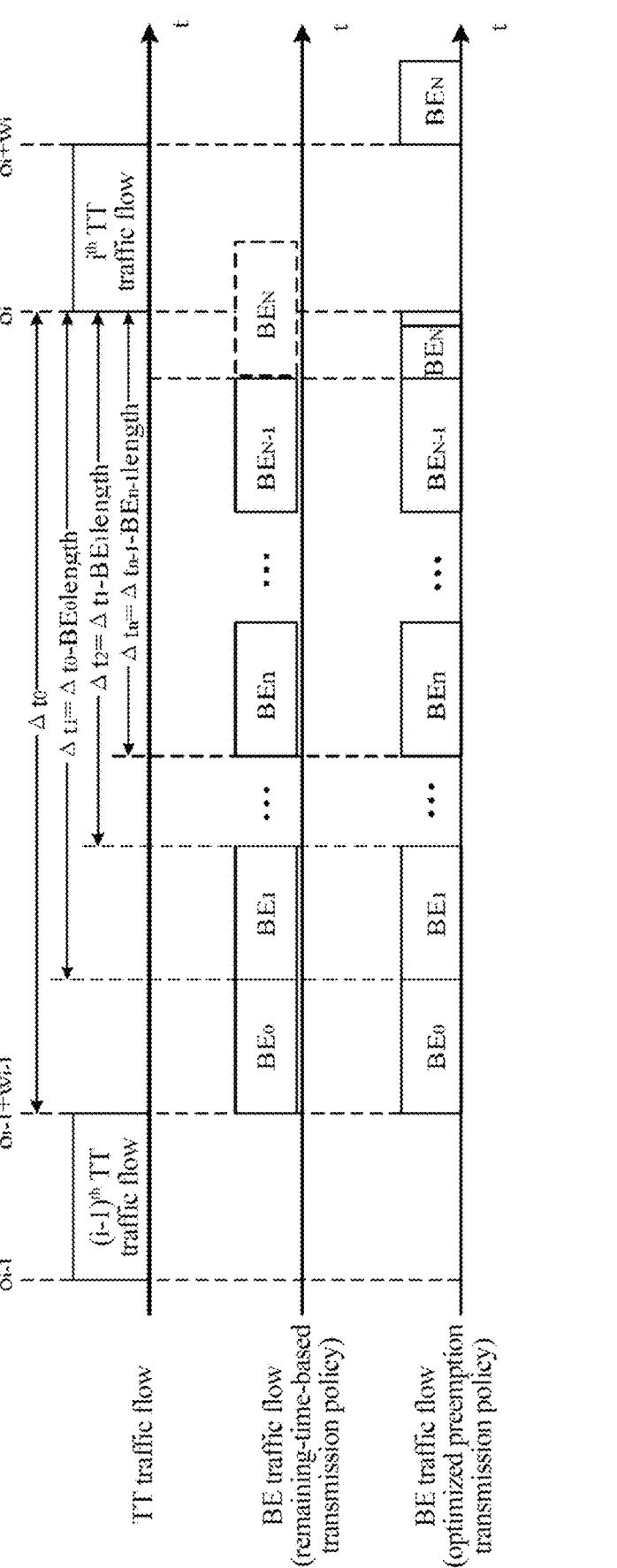
FIG. 9 is a schematic diagram illustrating timing principles of a remaining-time-based transmission policy and an optimized preemption transmission policy according to an embodiment of the present disclosure.

As shown in FIG. 8 and FIG. 9, in some embodiments, generating the transmission control policy based on the length of messages that can be sent in the remaining time and the message length in the step S1320 includes the following steps.

At a step S1321, it is determined, based on the length of messages that can be sent in the remaining time and the message length, whether the length of messages that can be sent in the remaining time is sufficient to send the current traffic flow to be sent $BE_{n-1}$. If so, a step of S1322 is executed; otherwise, a step of S1323 is executed.

At the step S1322, the current traffic flow to be sent $BE_{n-1}$ is sent.

The following steps are repeatedly executed until the length of the transmissible message in the remaining time is insufficient to send a current traffic flow to be sent $BE_N$:

At the step S1100, current time information is re-acquired.

At the step S1200, message attribute information of a current traffic flow to be sent is re-acquired.

At the step S1310, a length of messages that can be sent in a remaining time is calculated based on the current time information and a start time of a next time-sensitive traffic flow.

At the step S1320, it is determined, based on the length of messages that can be sent in the remaining time and the message length, whether the length of messages that can be sent in the remaining time is sufficient to send the current traffic flow to be sent $BE_n$; if so, a step S1322 is executed; otherwise, a step S1323 is executed.

At the step S1322, the current traffic flow to be sent $BE_n$ is sent, and the steps S1100 to S1320 are repeatedly executed.

At the step S1323, using up of the length of messages that can be sent in the remaining time is waited for. For example, a preemption instruction may be sent to use up the length of messages that can be sent in the remaining time, and then the next time-sensitive traffic flow is sent.

In some embodiments, the transmission control policy is the remaining-time-based transmission policy.

The following embodiments are described using an example where the time-sensitive traffic flow is a TT traffic flow and the non-time-sensitive traffic flow is a BE traffic flow. In some embodiments, the BE traffic flow is always sent in a gap between TT traffic flows, and the length of this gap is predictable. As shown in FIG. 9, FIG. 9 illustrates two adjacent entries (i−1) and i in the scheduling table. When an $(i-1)^{th}$ entry control transmission gate finishes sending of a TT traffic flow, sending of a BE traffic flow begins, until an $i^{th}$ entry starts to be executed. The time for sending the BE traffic flow is the gap, i.e., a first length of messages that can be sent in the remaining time $\Delta t_0$, from an execution end time $o_{i-1} + w_{i-1}$ of the $(i-1)^{th}$ entry to an execution start time $o_i$ of the $i^{th}$ entry. The entries are scheduling table entries, and each scheduling table entry is configured to record scheduling related information of one TT traffic flow. The entry (i−1) correspondingly records scheduling related information of the $(i-1)^{th}$ TT traffic flow, and the entry i correspondingly records scheduling related information of the $i^{th}$ TT traffic flow.

Therefore, the gap based on TT traffic flows is predictable, and the remaining-time-based transmission policy designed in the embodiments of the present disclosure is as follows, which includes following steps.

At a step S1-1, when the sending of the TT traffic flow of the $(i-1)^{th}$ entry is complete, the step S1310 is executed to initialize a sending gap $\Delta t$ for BE traffic flows, i.e., the first length of messages that can be sent in the remaining time $\Delta t_0$, which is from the end time $o_{i-1} + w_{i-1}$ of the $(i-1)^{th}$ entry to the execution start time $o_i$ of the $i^{th}$ entry, where $\Delta t_0 = o_i - (o_{i-1} + w_{i-1})$.

At a step S1-2, the step S1320 is executed to determine whether the length of messages that can be sent in the remaining time $\Delta t_0$ is sufficient to send a queue head message $BE_{n-1}$ (the current traffic flow to be sent) of a BE traffic flow queue. If so, a step S1-3 is executed; otherwise, a step S1-5 is executed.

At the step S1-3, the step S1322 is executed to send the queue head message $BE_{n-1}$ of the BE traffic flow queue.

At a step S1-4, the step S1310 is executed to update the length of messages that can be sent in the remaining time by $\Delta t_n = \Delta t_{n-1} - BE_{n-1} \cdot length$, and the, the step S1-2 is executed.

At the step S1-5, the step S1323 is executed to wait for the length of messages that can be sent in the remaining time to be used up, the $i^{th}$ entry of the scheduling table starts to be executed, and an index is updated by i=i+1. The process goes back to the step S1-1. For example, a preemption instruction may be sent to use up the length of messages that can be sent in the remaining time, and then the next time-sensitive traffic flow is sent.

The remaining-time-based transmission policy allows for sending as many BE traffic flows as possible in the gap between TT traffic flows, until the remaining time is not sufficient to send a complete BE message.

According to the remaining-time-based transmission policy, the remaining time that can be used iteratively. Compared with the guard band policy proposed in 802.1 Qbv, the gap between TT traffic flows can be used iteratively until the remaining time is insufficient to send the current BE traffic flow. A core improvement of this policy is to use the remaining time to adapt to the message length of the BE traffic flow, while a maximum message length is selected as a fixed length of the guard band according to the guard band policy.

In some embodiments, calculating a length of messages that can be sent in a remaining time based on the current time information and a start time of a next time-sensitive traffic flow in the step S1310 includes a following step.

At a step S1311, the length of messages that can be sent in the remaining time is determined based on the current time information, the start time of the next time-sensitive traffic flow, a transmission constraint parameter, and a first calculation formula, where the first calculation formula is as follows:

> length of messages that can be sent in the remaining
> time=length of messages that can be sent corre-
> sponding to a difference between start time of
> the next time-sensitive traffic flow and current
> time information−transmission constraint
> parameter.

In some embodiments, it is necessary to consider a transmission constraint parameter that satisfies Ethernet message transmission, for example, an IPG, a SMD, a preamble, a FRAG_COUNT and the like. In other words, the transmission constraint parameter needs to be subtracted from the length of messages that can be sent in the remaining time, to obtain an actual transmission time length for BE traffic flow transmission.

In some embodiments, the transmission constraint parameter includes an IPG, a SMD, a preamble, and a FRAG-_COUNT. Accordingly, the first calculation formula is as follows:

> length of messages that can be sent in the remaining
> time=length of messages that can be sent corre-
> sponding to a difference between start time of
> the next time-sensitive traffic flow and current
> time information−total length of an IPG, pre-
> amble, SMD, and FRAG_COUNT.

In some embodiments, the IPG is 12 bytes, the preamble is $\kappa$ bytes, the SMD is 1 byte, and the FRAG_COUNT is 1 byte, totaling 20 bytes, i.e., the transmission constraint parameter is 20 bytes. In the calculation of the length of messages that can be sent in the remaining time in the above steps S1310 and 1-4, the transmission constraint parameter of 20 bytes needs to be subtracted from the length of messages that can be sent in the remaining time.

As shown in FIG. 10, in some embodiments, generating the transmission control policy based on the length of messages that can be sent in the remaining time and the message length in the step S1320 includes the following step.

At a step S1324, it is determined, based on the length of messages that can be sent in the remaining time and the message length, whether the length of messages that can be sent in the remaining time is sufficient to send the current traffic flow to be sent.

At a step S1325, a preemption control policy is generated based on the length of messages that can be sent in the remaining time, the message length, and a preemption constraint condition parameter if the length of messages that can be sent in the remaining time is not sufficient to send the current traffic flow to be sent.

In some embodiments, the transmission control policy is the optimized preemption control policy. In order to further reduce the bandwidth loss caused by the remaining-time-based transmission policy without causing any additional latency jitter, as shown in FIG. 9, when the length of messages that can be sent in the remaining time $\Delta t_N$ is not sufficient to send a message $BE_N$, the optimized preemption control policy is introduced. The optimized preemption control policy predicts a preemption position Position based on the length of messages that can be sent in the remaining time $\Delta t_N$ and the message length $BE_N$-length (i.e., sends the current traffic flow to be sent, and initiates a preemption instruction at a preset position Position of the length of messages that can be sent in the remaining time to stop sending (truncate) the current traffic flow to be sent, where a position corresponding to a first bit for transmitting a part of the current traffic flow to be sent is set to 1), to minimize the bandwidth loss. In some embodiments, the preemption policy needs to satisfy a preemption constraint condition parameter. The preemption constraint condition parameter includes a minimum transmission frame length, a truncatable message minimum frame length, a preemption CRC check field length, etc. For example, in order to ensure that the truncated message is a valid Ethernet frame, it is required that the length of each of the two parts of the message obtained after truncation should be greater than a minimum Ethernet frame length. Therefore, the length of messages that can be sent in the remaining time $\Delta t_N$ should not be less than a minimum frame length requirement, and the message length of the current BE traffic flow to be sent $BE_N$ should not be less than the truncatable message minimum frame length.

In some embodiments, the optimized preemption control policy is as follows.

In some embodiments, the preemption constraint condition parameter includes a minimum transmission frame length and a truncatable message minimum frame length.

In some embodiments, the preemption control policy includes following steps.

At a step S1325-A, the length of messages that can be sent in the remaining time is used up, if the message length does not satisfy the truncatable message minimum frame length. For example, the truncatable message minimum frame length is 124 bytes. In other words, when $BE_N$-length<124, $BE_N$ cannot be truncated, preemption cannot be realized, the bandwidth loss is $\Delta t_N$, and Position is 0.

At a step S1325-B, the length of messages that can be sent in the remaining time is used up, if the length of messages that can be sent in the remaining time does not satisfy the minimum transmission frame length. For example, the minimum transmission frame length is 64 bytes. In other words, when $\Delta t_N$<64, the $BE_N$ cannot be truncated, preemption cannot be realized, the bandwidth loss is $\Delta t_N$, and Position is 0.

At a step S1325-C, the current traffic flow to be sent is sent and a preemption instruction is initiated at a preset position in the length of messages that can be sent in the remaining time to stop sending (truncate) the current traffic flow to be sent, if the message length satisfies the truncatable message minimum frame length and the length of messages that can be sent in the remaining time satisfies the minimum transmission frame length, thereby ensuring real-time sending of the next TT traffic flow. For example, the truncatable message minimum frame length is 124 bytes, and the minimum transmission frame length is 64 bytes. In other words, when $BE_N \cdot \text{length} \geq 124$ and $\Delta t_N \geq 64$, a part of the current traffic flow to be sent is sent before the preset position Position in the length of messages that can be sent in the remaining time, and the current traffic flow to be sent is truncated at the preset position Position to realize preemption, thereby ensuring the real-time sending of the next TT traffic flow.

In some embodiments, the preemption constraint condition parameter further includes a preemption cyclic redundancy check (CRC) check field length.

In the step S1325-C, transmitting a part of the current traffic flow to be sent at the preset position in the length of messages that can be sent in the remaining time includes the following steps.

At a step S1325-C1, if a sum of the message length and the preemption CRC check field length is greater than or equal to a sum of the length of messages that can be sent in the remaining time and the minimum transmission frame length, the preset position is a difference between the length of messages that can be sent in the remaining time and the preemption CRC check field length. Accordingly, initiating a preemption instruction at a preset position in the length of messages that can be sent in the remaining time includes: the preemption instruction is initiated after a length which is obtained by subtracting the preemption CRC check field length from the length of messages that can be sent in the remaining time.

Position of the message length that can be sent in the remaining time (i.e. a preemption instruction is initiated after a length which is obtained by subtracting the minimum transmission frame length (e.g., 64 bytes) from the message length $BE_N \cdot \text{length}$ (i.e., a part of the current traffic flow to be sent) is sent), in order to realize preemption. The preemption position is Position=$BE_N \cdot \text{length}$−64. The bandwidth loss is $\Delta t_N$−($BE_N \cdot \text{length}$−64)+24=$\Delta t_N$−$BE_N \cdot \text{length}$+88.

To sum up, in an example where the truncatable message minimum frame length is 124 bytes, the minimum transmission frame length is 64 bytes, and the preemption CRC check field length is 4 bytes, the optimized preemption control policy is as follows.

When $BE_N \cdot \text{length} < 124$, preemption cannot be realized for $BE_N$, the bandwidth loss is $\Delta t_N$, and Position is 0.

When $BE_N \cdot \text{length} \geq 124$, $\Delta t_N < 64$, preemption cannot be realized for $BE_N$, the bandwidth loss is $\Delta t_N$, and Position is 0.

When $BE_N \cdot \text{length} \geq 124$, $\Delta t_N \geq 64$, $BE_N \cdot \text{length}$−($\Delta t_N$−4)$\geq 64$, preemption is realized for $BE_N$, the preemption position is Position=($\Delta t_N$−4), and the bandwidth loss is extra bandwidth consumption of 24 bytes caused by frame preemption.

When $BE_N \cdot \text{length} \geq 124$, $\Delta t_N \geq 64$, $BE_N \cdot \text{length}$−($\Delta t_N$−4)$< 64$ preemption is realized for $BE_N$, the preemption position is Position=$BE_N \cdot \text{length}$−64, and the bandwidth loss is $\Delta t_N$−($BE_N \cdot \text{length}$−64)+24=$\Delta t_N$−$BE_N \cdot \text{length}$+88.

Therefore, an optimized preemption control policy formula (1) is obtained as follows:

$$\text{position} = \begin{cases} 0, & BE_N \cdot \text{length} < 124 \\ 0, & BE_N \cdot \text{length} \geq 124,\ \Delta t_N < 64 \\ \Delta t_N - 4, & BE_N \cdot \text{length} \geq 124,\ \Delta t_N \geq 64,\ BE_N \cdot \text{length} - \Delta t_N \geq 60 \\ BE_N \cdot \text{length} - 64, & BE_N \cdot \text{length} \geq 124,\ \Delta t_N \geq 64,\ BE_N \cdot \text{length} - \Delta t_N < 60 \end{cases} \quad (1)$$

For example, the truncatable message minimum frame length is 124 bytes, the minimum transmission frame length is 64 bytes, and the preemption CRC check field length is 4 bytes. The preemption CRC check field is a CRC check code. That is, when $BE_N \cdot \text{length} \geq 124$, $\Delta t_N \geq 64$, and $BE_N \cdot \text{length}$−($\Delta t_N$−4)$\geq 64$, a preemption instruction is initiated after a length which is obtained by subtracting the preemption CRC check field length (4 bytes) from the length of messages that can be sent in the remaining time (i.e., a part of the current traffic flow to be sent) is sent, in order to realize preemption. The preemption position is Position=($\Delta t_N$−4). The bandwidth loss is extra bandwidth consumption of 24 bytes caused by frame preemption, i.e., a sum of the CRC check code (4 bytes), the IPG (12 bytes), the preamble (6 bytes), the SMD (1 byte), and the FRAG_COUNT (1 byte).

At a step S1325-C2, if the sum of the message length and the preemption CRC check field length is less than the sum of the length of messages that can be sent in the remaining time and the minimum transmission frame length, the preset position is a difference between the message length and the minimum transmission frame length. Accordingly, initiating a preemption instruction at a preset position in the length of messages that can be sent in the remaining time includes: the preemption instruction is initiated after a length which is obtained by subtracting the minimum transmission frame length from the message length. The preemption CRC check field is a CRC check code. That is, when $BE_N \cdot \text{length} \geq 124$, $\Delta t_N \geq 64$, and $BE_N \cdot \text{length}$−($\Delta t_N$−4)$< 64$, a part of the current traffic flow to be sent is sent before the preset position In some embodiments, the remaining-time-based transmission policy and the optimized preemption control policy may be used in combination to form the following execution procedure, which includes the following steps.

At a step S2-1, when the sending of the TT traffic flow of the (i−1)$^{th}$ entry is complete, the step S1310 is executed to initialize a sending gap $\Delta t$ for BE traffic flows, which is from the end time $o_{i-1}$+$w_{i-1}$ of the (i−1)$^{th}$ entry to the execution start time $o_i$ of the i$^{th}$ entry, where $\Delta t = o_i - (o_{i-1} + w_{i-1})$.

At a step S2-2, the step S1320 is executed to determine whether the gap $\Delta t$ is sufficient to send a queue head message of a BE traffic flow queue. If so, a step S2-3 is executed; otherwise, a step S2-5 is executed.

At the step S2-3, the queue head message of the BE traffic flow queue is sent.

At a step S2-4, the gap $\Delta t = \Delta t - BE \cdot \text{length}$ is updated, and the step S2-2 is executed.

At the step S2-5, preemption is performed at the position Position of the BE message according to the optimized preemption control policy formula (1).

At a step S2-6, when the remaining time is used up, the i$^{th}$ entry of the scheduling table starts to be executed, where let i=i+1, and the process goes back to the step S2-1.

The optimized preemption control policy makes use of the remaining time that is not sufficient to send a complete BE message in the remaining-time-based transmission policy to send as many messages as possible, thereby further avoiding bandwidth waste.

In some embodiments, the optimized preemption control policy in the predictive hybrid transmission control policy improves the remaining-time-based transmission policy to further reduce the bandwidth loss. When the remaining time is not sufficient to send the current BE traffic flow message completely, the optimized preemption control policy can further reduce the bandwidth loss by selecting an optimal preemption position, thereby achieving the advantage of the 802.3 BR frame preemption policy in reducing the bandwidth loss, and avoiding the latency jitter caused by frame preemption.

The remaining-time-based transmission policy and the optimized preemption control policy are further illustrated by taking Example one as an example.

As shown in FIG. 9, the remaining-time-based transmission policy and the optimized preemption control policy may be implemented in an output selection unit of a TAS. The output selection unit needs to acquire an execution start time of a scheduling entry to be executed from a gate control unit, and needs to acquire a message length of a queue head message from a BE traffic flow queue. There are a total of four states. The execution process of the remaining-time-based transmission policy and the optimized preemption control policy is illustrated using Example one below.

Example One

A. A configuration of a scheduling table is shown in table one:

TABLE ONE

| | | | | | Gate control list | | | | | | | | | |
|---|---|---|---|---|---|---|---|---|---|---|---|---|---|---|
| | Start | TT data flow | | | TT | BE | | | | | | | | |
| Window | time | id | period | length | 0 | 1 | 2 | 3 | 4 | 5 | 6 | 7 | 8 |
| . . . | . . . | . . . | . . . | . . . | . . . . . . . . . . . . . . . . . . . . . . . . . . . | | | | | | | | |
| 672 ns | 100 μs | 31 | 1 ms | 64 | 0 | 1 | 1 | 1 | 1 | 1 | 1 | 1 | 1 |
| 4256 ns | 120 μs | 47 | 4 ms | 512 | 0 | 1 | 1 | 1 | 1 | 1 | 1 | 1 | 1 |
| . . . | . . . | . . . | . . . | . . . | . . . . . . . . . . . . . . . . . . . . . . . . . . . | | | | | | | | | scheduling table of Example one

B. Queue status a) A queue header entry {ID, length, cache pool address} stored in a queue #0 (TT traffic flow queue) is: {47, 512, 0x718}.

b) A BE traffic flow queue #1 stores a message with a length of 1518 bytes to be sent, and a queue #2 stores two messages with a length of 512 bytes to be sent.

c) Other BE traffic flow queues are empty.

C. A port rate is 1 Gbps, a current time is t=10000.100664 ms, and a crystal oscillator cycle (clk) is 8 ns. This means that the time after the next clock cycle is t=10000.100672 ms, at which moment the execution of the entry corresponding to the start time of 100 us in Table one is just completed.

D. A process of executing the remaining-time-based transmission policy and the optimized preemption control policy under the conditions A, B, and C is as follows.

i. At time t=10000.100672 ms, the execution of the TT traffic flow entry corresponding to the start time of 100 us in Table one is completed. At this moment, a control gate of the queue #0 is turned off, while a control gate of a BE traffic flow queue is turned on, so that a state 1 is executed.

ii. State 1: The length of messages that can be sent in the remaining time Δt from the current time t=10000.100672 ms to a start time of sending of a next TT traffic flow is calculated as follows:

$$\Delta t = (10000.200000 - 10000.100672) \text{ ms} = 19328 \text{ ns} = 2416 \text{ bytes}.$$

Considering that the transmission constraint parameter is 20 bytes, the actual length of messages that can be sent in the remaining time is Δt=2416−20=2396 bytes. Because both the queue #1 and the queue #2 have a message to be sent, and the queue #1 has a higher priority than the queue #2, the length of the queue head message of the queue #1 is acquired, which is 1518 bytes and is less than the number of bytes of 2396 allowed to be sent in Δt. The queue head message of the queue #1 can be sent. A state 2 is executed.

iii. State 2: The message with a length of 1518 bytes in the queue #1 is sent, and after the sending is completed, a state 1 is executed.

iv. State 1: The remaining time is calculated as Δt=2396−1518−20=858 bytes. At this moment, the queue #1 is empty. The length of the queue head message of the queue #2 is read, which is 512 bytes and is less than the number of bytes of 856 allowed to be sent in Δt, so the queue head message of the queue #2 can be sent. A state 2 is executed.

v. State 2: The queue head message of the queue #2 is sent. After the sending is completed, a state 1 is executed.

vi. State 1: The remaining time is calculated as Δt=858−512−20=326 bytes. At this moment, only the queue #2 has a message to be sent. The length of the queue head message of the queue #2 is read, which is 512 bytes and is greater than the number of bytes of 326 allowed to be sent in Δt. A state 3 is executed to calculate an optimal preemption position.

vii. State 3: The optimal preemption position is calculated based on the message length of 512 and the remaining time 326. Because 512−(326−4)≥64, the optimal preemption position (preset position Position) is at byte 326−4−322 after the message is sent, and a state 4 is executed to perform frame preemption.

viii. State 4: The queue head message of the queue #2 is sent, and frame preemption is performed at byte 322.

ix. When the frame preemption is completed, the length of messages that can be sent in the remaining time becomes 0. At this moment, the sending of the next TT traffic flow in the scheduling table is executed.

In some embodiments, the current traffic flow to be sent is a time-sensitive traffic flow.

As shown in FIG. 11, generating a transmission control policy according to the current time information and the message attribute information in the step S1300 includes the following steps.

At a step S1340, message attribute information of a pre-transmitted time-sensitive traffic flow is acquired based on the current time information and a scheduling table, which includes a correspondence between the current time information and the message attribute information of the pre-transmitted time-sensitive traffic flow.

At a step S1350, it is determined whether the message attribute information of the current traffic flow to be sent matches the message attribute information of the pre-transmitted time-sensitive traffic flow.

At a step S1360, the current traffic flow to be sent is sent, if the message attribute information of the current traffic flow to be sent matches the message attribute information of the pre-transmitted time-sensitive traffic flow; otherwise, a non-time-sensitive traffic flow is sent, if the message attribute information of the current traffic flow to be sent does not match the message attribute information of the pre-transmitted time-sensitive traffic flow.

In some embodiments, the transmission control policy is a reserved bandwidth reuse policy. The following embodiments are described using an example where the time-sensitive traffic flow is a TT traffic flow and the non-time-sensitive traffic flow is a BE traffic flow.

In some embodiments, the start time point of the TT traffic flow in TSN is predictable. The TAS defined by 802.1 Qbv organizes the precise start time points of TT traffic flows into a scheduling table. Assuming that the start time point of an $i^{th}$ row of data flows $f_{i,1}, \ldots, f_{i,j}$ is $o_i$, the duration of sending is $w_i$, and an execution period of the entire scheduling table is MacroPeriod. That is, the start time point of sending the $i^{th}$ row of data flows $f_{i,1}, \ldots, f_{i,j}$ for an $n^{th}$ time is $o_i + n*$MacroPeriod. Once a TT traffic flow misses its start time point, the data flow will not be transmitted in this window; otherwise, it disrupts the real-time and deterministic nature of the time-triggered transmission mechanism.

Therefore, based on the above predictability, the reserved bandwidth reuse policy designed by the present disclosure is as follows, which includes the following steps.

At the step S3-3, the transmission control gate of the TT traffic flow queue is turned off, and at the same time the transmission control gate of the BE traffic flow is turned on to send the BE traffic flow.

According to the reserved bandwidth reuse policy, when no TT traffic flow needs to be sent, a BE traffic flow can be sent by reusing the reserved bandwidth, so as not to waste the reserved bandwidth. An algorithm 1 illustrates an algorithm procedure of the reserved bandwidth reuse policy.

In the embodiments of the present disclosure, a reusable reserved bandwidth for TT traffic flows is constructed. When no TT traffic flow needs to be sent, the reserved bandwidth reuse policy in predictive hybrid transmission control policy can reuse the reserved bandwidth for TT traffic flows, in order to avoid a bandwidth waste.

In some embodiments, sending a non-time-sensitive traffic flow in the step S1360 includes a following step.

At a step S1361, the non-time-sensitive traffic flow with a high priority is preferentially sent based on priorities of the non-time-sensitive traffic flows.

In some embodiments, the message attribute information includes traffic flow ID information; or the message attribute information includes traffic flow ID information and a message length.

The reserved bandwidth reuse policy of the present disclosure is further illustrated below by using Example two.

As shown in FIG. 9, in some embodiments, the reserved bandwidth reuse policy may be applied by a gate control unit of the TAS. In the implementation process, the message attribute information of the TT traffic flow queue, for example, queue status information, queue head traffic flow ID information, and message length, needs to be obtained. The reserved bandwidth reuse policy is executed at the beginning of each entry in the scheduling table, and has a total of 4 states. The execution process of the reserved bandwidth reuse policy is illustrated below by way of Example two.

Example Two

A. Two entries subsequently to be executed in the scheduling table are shown in Table two:

TABLE TWO

| | | | | | | | | | | Gate control list | | | | | |
| --- | --- | --- | --- | --- | --- | --- | --- | --- | --- | --- | --- | --- | --- | --- | --- |
| | Start | TT data flow | | | TT | | | | | BE | | | | | |
| Window | time | id | period | length | 0 | 1 | 2 | 3 | 4 | 5 | 6 | 7 | 8 |
| . . . | . . . | . . . | . . . | . . . | . . . . . . . . . . . . . . . . . . . . . . . . . . . | | | | | | | | |
| 1184 ns | 200 µs | 30 | 1 ms | 128 | 0 | 1 | 1 | 1 | 1 | 1 | 1 | 1 | 1 |
| 2208 ns | 500 µs | 48 | 2 ms | 256 | 0 | 1 | 1 | 1 | 1 | 1 | 1 | 1 | 1 |
| . . . | . . . | . . . | . . . | . . . | . . . . . . . . . . . . . . . . . . . . . . . . . . . | | | | | | | | |

<p style="text-align:center">scheduling table of Example two</p>

At a step S3-1, when a start time point of a TT traffic flow is reached, the step S1350 is first executed to detect whether the queue head message of the TT traffic flow queue is a data flow message agreed in the scheduling table. If so, a step S3-2 is executed; otherwise, a step S3-3 is executed.

At the step S3-2, a transmission control gate of the TT traffic flow queue is turned on, and at the same time a transmission control gate of a BE traffic flow is turned off to send a message of the current TT traffic flow.

B. Queue status a) A queue header entry {ID, length, cache pool address} stored in a queue #0 (TT traffic flow queue) is: {48, 256, 0x666}.

b) Other queues (BE traffic flow queues) all have data.

C. A port rate is 1 Gbps, a current time is t=10000.199992 ms, and a crystal oscillator cycle (clk) is 8 ns. This means that the time after the next clock cycle is t=10000.2000000 ms, at which moment the execution of the entry corresponding to the start time of 200 us in Table two begins to be performed.

D. A process of executing the reserved bandwidth reuse policy under the conditions A, B, and C is as follows.

i. At time t=10000.200000 ms, a state 1 is executed. The entry corresponding to the start time of 200 us in Table two is read to acquire TT traffic flow information {30, 128}. It is determined that the queue #0 is not empty, and a state 2 is executed.

ii. State 2: Queue head information of the queue #0 is acquired as: {48, 256, 0x666}, which is inconsistent with the TT traffic flow information {30,128}, indicating that the TT traffic flow has not arrived. A state 4 is executed.

iii. State 4: A control gate of the queue #0 remains off, and control gates of other BE traffic flow queues are turned on to send BE data.

iv. The BE data is sent, until the time reaches t=10000.500000 ms. Then, the state 1 is executed again.

v. State 1: Next TT traffic flow information {48, 256} in Table two is read. It is determined that the queue #0 is not empty, and a state 2 is executed.

vi. State 2: Queue head information of the queue #0 is acquired as: {48, 256, 0x666}, which is consistent with the information {48, 256} of the TT traffic flow, indicating that the TT traffic flow has arrived. A state 3 is executed.

vii. State 3: The control gate of the queue #0 is turned on, and the control gates of other BE traffic flow queues are turned off to send the TT traffic flow.

viii. When the sending of the TT traffic flow is completed in the window time of 2208 ns, the control gate of the queue #0 is turned off, and the control gates of other BE traffic flow queues are turned on to start sending BE data.

ix. The BE data is sent until a start time point for sending a next TT traffic flow in the scheduling table is reached. Then, the state 1 is executed.

In the embodiments of the present disclosure, a transmission control policy is generated based on current time information and message attribute information of a current traffic flow to be sent, to control transmission of traffic flows, thereby effectively improving the bandwidth utilization rate without affecting the real-time and deterministic transmission of time-sensitive traffic flows. This can effectively improve the bandwidth utilization rate without affecting the real-time and deterministic transmission of time-sensitive traffic flows.

In addition, as shown in FIG. 12, an embodiment of the present disclosure provides a data transmission apparatus including follow modules.

A time acquisition module 110 is configured to acquire current time information.

A message attribute acquisition module 120 is configured to acquire message attribute information of a current traffic flow to be sent.

A policy generation module 130 is configured to generate a transmission control policy based on the current time information and the message attribute information.

The transmission module 140 is configured to control traffic flow transmission in time-sensitive networking based on the transmission control policy.

In some embodiments, the time acquisition module 110 is configured to execute the above step S1100, the message attribute acquisition module 120 is configured to execute the above step S1200, the policy generation module 130 is configured to execute the above step S1300, and the transmission module 140 is configured to execute the above step S1400. It should be noted that the data transmission apparatus in this embodiment may be a data transmission apparatus in the system architecture in the embodiment shown in FIG. 4. In addition, the data transmission apparatus in this embodiment may execute the data transmission method in the embodiment shown in FIG. 5. In other words, the data transmission apparatus in this embodiment, the data transmission apparatus in the system architecture in the embodiment shown in FIG. 4, and the data transmission method in the embodiment shown in FIG. 5 belong to the same inventive concept. Therefore, these embodiments have the same implementation principle and technical effects, and the details will not be repeated here.

The apparatus embodiments described above are merely examples. The units described as separate components may or may not be physically separated, i.e., they may be located in one place or may be distributed over a plurality of network units. Some or all of the modules may be selected according to actual needs to achieve the objects of the scheme of this embodiment.

In addition, an embodiment of the present disclosure further provides an electronic device, including: a memory, a processor, and a computer program stored in the memory and executable by the processor. The computer program, when executed by the processor, causes the processor to implement the data transmission method.

The memory, as a non-transitory computer-readable storage medium, may be configured to store a non-transitory software program and a non-transitory computer-executable program. In addition, the memory may include a high speed random access memory, and may further include a non-transitory memory, e.g., at least one magnetic disk storage device, flash memory device, or other non-transitory solid-state storage device. In some implementations, the memory may include memories located remotely from the processor, and the remote memories may be connected to the processor via a network. Examples of the network include, but are not limited to, Internet, intranet, local area network, mobile communication network, and combinations thereof.

It should be noted that the electronic device in this embodiment may be an electronic device in the system architecture in the embodiment shown in FIG. 4. In addition, the electronic device in this embodiment may be configured to execute the data transmission method in the embodiment shown in FIG. 5. In other words, the electronic device in this embodiment, the electronic device in the system architecture in the embodiment shown in FIG. 4, and the data transmission method in the embodiment shown in FIG. 5 belong to the same inventive concept. Therefore, these embodiments have the same implementation principle and technical effects, and the details will not be repeated here.

The non-transitory software program and instructions required to implement the data transmission method of the foregoing embodiments are stored in the memory which, when executed by the processor, cause the processor to implement the data transmission method of the foregoing embodiments, for example, execute the steps S1100 to S1400 in FIG. 5, the steps S1310 to S1320 in FIG. 6, the steps S1330, S1320, and S1310 in FIG. 7, the steps S1100, S1200, S1310, S1320, and S1323 in FIG. 8, the steps S1324 to S1325 in FIG. 10, and the steps S1340 to S1360 in FIG. 11.

In addition, an embodiment of the present disclosure further provides a computer-readable storage medium, storing a computer-executable instruction which, when executed by a processor, causes the processor to implement the data transmission method as discussed above.

In some embodiments, the computer-readable storage medium stores computer-executable instructions. The computer-executable instructions, when executed by a processor or controller, for example, by a processor in the embodiment described above, may cause the processor to implement the data transmission method of the foregoing embodiments, for example, execute the steps S1100 to S1400 in FIG. 5, the steps S1310 to S1320 in FIG. 6, the steps S1330, S1320, and S1310 in FIG. 7, the steps S1100, S1200, S1310, S1320, and S1323 in FIG. 8, the steps S1324 to S1325 in FIG. 10, and the steps S1340 to S1360 in FIG. 11.

In the embodiments of the present disclosure, a transmission control policy is generated based on current time information and message attribute information of a current traffic flow to be sent, to control transmission of traffic flows, thereby effectively improving the bandwidth utilization rate without affecting the real-time and deterministic transmission of time-sensitive traffic flows.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As well known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but is not limited to, Random Access Memory (RAM), Read-Only Memory (ROM), Electrically Erasable Programmable Read-Only Memory (EEPROM), flash memory or other memory technology, Compact Disc Read-Only Memory (CD-ROM), Digital Versatile Disc (DVD) or other optical storage, cassette, magnetic tape, magnetic disk storage or other magnetic storage device, or any other medium which can be used to store the desired information and which can be accessed by a computer. In addition, as well known to those having ordinary skills in the art, the communication medium typically includes computer-readable instructions, data structures, program modules, or other data in a modulated data signal such as a carrier or other transport mechanism, and can include any information delivery medium.

Although some implementations of the embodiments of the present disclosure have been described above, the embodiments of the present disclosure are not limited thereto. Those having ordinary skills in the art can make various equivalent modifications or replacements without departing from the scope of the embodiments of the present disclosure. Such equivalent modifications or replacements fall within the scope defined by the claims of the embodiments of the present disclosure.

What is claimed is:

1. A data transmission method, comprising:
   acquiring current time of day information;
   acquiring message attribute information of a current traffic flow to be sent;
   in response to the current traffic flow to be sent being a time-sensitive traffic flow, acquiring message attribute information of a pre-transmitted time-sensitive traffic flow based on the current time information and a scheduling table, wherein the scheduling table comprises a correspondence between the current time information and the message attribute information of the pre-transmitted time-sensitive traffic flow;
   determining whether the message attribute information of the current traffic flow to be sent matches the message attribute information of the pre-transmitted time-sensitive traffic flow; and
   sending the current traffic flow to be sent, in response to the message attribute information of the current traffic flow to be sent matching the message attribute information of the pre-transmitted time-sensitive traffic flow; otherwise, sending a non-time-sensitive traffic flow; and
   in response to the current traffic flow to be sent being a non-time-sensitive traffic flow,
   calculating a length of messages that can be sent in a remaining time based on the current time information and a start time of a next time-sensitive traffic flow; and
   generating the transmission control policy based on the length of messages that can be sent in the remaining time and a message length of the message attribute information.

2. The method of claim 1, wherein generating the transmission control policy based on the length of messages that can be sent in the remaining time and the message length comprises:
   determining, based on the length of messages that can be sent in the remaining time and the message length, whether the length of messages that can be sent in the remaining time is sufficient to send the current traffic flow to be sent;
   sending the current traffic flow to be sent in response to the length of messages that can be sent in the remaining time being sufficient to send the current traffic flow to be sent; and
   repeatedly executing following steps until the length of the messages that can be sent in the remaining time is insufficient to send the current traffic flow to be sent:
   re-acquiring current time information;
   re-acquiring message attribute information of a current traffic flow to be sent;
   calculating the length of messages that can be sent in the remaining time based on the current time information and a start time of a next time-sensitive traffic flow; and
   determining, based on the length of messages that can be sent in the remaining time and the message length, whether the length of messages that can be sent in the remaining time is sufficient to send the current traffic flow to be sent; and
   sending the current traffic flow to be sent in response to the length of messages that can be sent in the remaining time being sufficient to send the current traffic flow to be sent.

3. The method of claim 1, wherein calculating a length of messages that can be sent in a remaining time based on the current time information and a start time of a next time-sensitive traffic flow comprises:
   calculating the length of messages that can be sent in the remaining time based on the current time information, the start time of the next time-sensitive traffic flow, a transmission constraint parameter, and a first calculation formula as follows:

length of messages that can be sent in the remaining time=length of messages that can be sent corresponding to a difference between start time of the next time-sensitive traffic flow and the current time information–transmission constraint parameter.

4. The method of claim 3, wherein the transmission constraint parameter comprises an interpacket gap (IPG), a Start mPacket Delimiter (SMD), a preamble, and a FRAG_COUNT;

and correspondingly, the first calculation formula is as follows:

length of messages that can be sent in the remaining time=length of messages that can be sent corresponding to a difference between start time of the next time-sensitive traffic flow and current time information–total length of an IPG, preamble, SMD, and FRAG_COUNT.

5. The method of claim 1, wherein prior to calculating a length of messages that can be sent in a remaining time based on the current time information and a start time of a next time-sensitive traffic flow, the method further comprises:

looking up a scheduling table for the start time of the next time-sensitive traffic flow.

6. The method of claim 1, wherein generating the transmission control policy based on the length of messages that can be sent in the remaining time and the message length comprises:

determining, based on the length of messages that can be sent in the remaining time and the message length, whether the length of messages that can be sent in the remaining time is sufficient to send the current traffic flow to be sent; and generating a preemption control policy based on the length of messages that can be sent in the remaining time, the message length, and a preemption constraint condition parameter in response to the length of messages that can be sent in the remaining time being not sufficient to send the current traffic flow to be sent.

7. The method of claim 6, wherein:

the preemption constraint condition parameter comprises a minimum transmission frame length and a truncatable message minimum frame length; and the preemption control policy comprises:

using up the length of messages that can be sent in the remaining time, in response to the message length not satisfying the truncatable message minimum frame length;

using up the length of messages that can be sent in the remaining time, in response to the length of messages that can be sent in the remaining time not satisfying the minimum transmission frame length; and sending the current traffic flow to be sent and initiating a preemption instruction at a preset position in the length of messages that can be sent in the remaining time to stop sending the current traffic flow to be sent, in response to the message length satisfying the truncatable message minimum frame length and the length of messages that can be sent in the remaining time satisfying the minimum transmission frame length.

8. The method of claim 7, wherein:

the preemption constraint condition parameter further comprises a preemption Cyclic Redundancy Check (CRC) check field length;

in response to a sum of the message length and the preemption CRC check field length being greater than or equal to a sum of the length of messages that can be sent in the remaining time and the minimum transmission frame length, the preset position is a difference between the length of messages that can be sent in the remaining time and the preemption CRC check field length; and correspondingly, initiating a preemption instruction at a preset position in the length of messages that can be sent in the remaining time comprises:

initiating the preemption instruction after a length which is obtained by subtracting the preemption CRC check field length from the length of messages that can be sent in the remaining time; and in response to the sum of the message length and the preemption CRC check field length being less than the sum of the length of messages that can be sent in the remaining time and the minimum transmission frame length, the preset position is a difference between the message length and the minimum transmission frame length; and correspondingly, initiating a preemption instruction at a preset position in the length of messages that can be sent in the remaining time comprises:

initiating the preemption instruction after a length which is obtained by subtracting the minimum transmission frame length from the message length.

9. The method of claim 1, wherein sending a non-time-sensitive traffic flow comprises:

sending the non-time-sensitive traffic flow based on priorities of the non-time-sensitive traffic flows.

10. The method of claim 1, wherein the message attribute information comprises traffic flow ID information; or the message attribute information comprises traffic flow ID information and a message length.

11. An electronic device, comprising: a memory, a processor, and a computer program stored in the memory and executable by the processor, wherein the computer program, when executed by the processor, causes the processor to:

acquire current time of day information;

acquire message attribute information of a current traffic flow to be sent;

in response to the current traffic flow to be sent being a time-sensitive traffic flow, acquire message attribute information of a pre-transmitted time-sensitive traffic flow based on the current time information and a scheduling table, wherein the scheduling table comprises a correspondence between the current time information and the message attribute information of the pre-transmitted time-sensitive traffic flow;

determine whether the message attribute information of the current traffic flow to be sent matches the message attribute information of the pre-transmitted time-sensitive traffic flow; and send the current traffic flow to be sent, in response to the message attribute information of the current traffic flow to be sent matching the message attribute information of the pre-transmitted time-sensitive traffic flow; otherwise, sending a non-time-sensitive traffic flow; and in response to the current traffic flow to be sent being a non-time-sensitive traffic flow, calculate a length of messages that can be sent in a remaining time based on the current time information and a start time of a next time-sensitive traffic flow; and generate the transmission control policy based on the length of messages that can be sent in the remaining time and a message length of the message attribute information.

12. The electronic device of claim 11, wherein generating the transmission control policy based on the length of messages that can be sent in the remaining time and the message length comprises:

determining, based on the length of messages that can be sent in the remaining time and the message length, whether the length of messages that can be sent in the remaining time is sufficient to send the current traffic flow to be sent;

sending the current traffic flow to be sent in response to the length of messages that can be sent in the remaining time being sufficient to send the current traffic flow to be sent; and repeatedly executing following steps until the length of the messages that can be sent in the remaining time is insufficient to send the current traffic flow to be sent:

re-acquiring current time information;

re-acquiring message attribute information of a current traffic flow to be sent;

calculating the length of messages that can be sent in the remaining time based on the current time information and a start time of a next time-sensitive traffic flow; and determining, based on the length of messages that can be sent in the remaining time and the message length, whether the length of messages that can be sent in the remaining time is sufficient to send the current traffic flow to be sent; and sending the current traffic flow to be sent in response to the length of messages that can be sent in the remaining time being sufficient to send the current traffic flow to be sent.

13. The electronic device of claim 11, wherein calculating a length of messages that can be sent in a remaining time based on the current time information and a start time of a next time-sensitive traffic flow comprises:

calculating the length of messages that can be sent in the remaining time based on the current time information, the start time of the next time-sensitive traffic flow, a transmission constraint parameter, and a first calculation formula as follows:

length of messages that can be sent in the remaining time=length of messages that can be sent corresponding to a difference between start time of the next time-sensitive traffic flow and the current time information−transmission constraint parameter.

14. The electronic device of claim 11, wherein prior to calculating a length of messages that can be sent in a remaining time based on the current time information and a start time of a next time-sensitive traffic flow, the computer-executable instruction which, when executed by the processor, cause the processor to:

look up a scheduling table for the start time of the next time-sensitive traffic flow.

15. The electronic device of claim 11, wherein generating the transmission control policy based on the length of messages that can be sent in the remaining time and the message length comprises:

determining, based on the length of messages that can be sent in the remaining time and the message length, whether the length of messages that can be sent in the remaining time is sufficient to send the current traffic flow to be sent; and generating a preemption control policy based on the length of messages that can be sent in the remaining time, the message length, and a preemption constraint condition parameter in response to the length of messages that can be sent in the remaining time being not sufficient to send the current traffic flow to be sent.

16. A non-transitory computer-readable storage medium, storing a computer-executable instruction which, when executed by a processor, cause the processor to:

acquire current time of day information;

acquire message attribute information of a current traffic flow to be sent;

in response to the current traffic flow to be sent being a time-sensitive traffic flow, acquire message attribute information of a pre-transmitted time-sensitive traffic flow based on the current time information and a scheduling table, wherein the scheduling table comprises a correspondence between the current time information and the message attribute information of the pre-transmitted time-sensitive traffic flow;

determine whether the message attribute information of the current traffic flow to be sent matches the message attribute information of the pre-transmitted time-sensitive traffic flow; and send the current traffic flow to be sent, in response to the message attribute information of the current traffic flow to be sent matching the message attribute information of the pre-transmitted time-sensitive traffic flow; otherwise, sending a non-time-sensitive traffic flow; and in response to the current traffic flow to be sent being a non-time-sensitive traffic flow, calculate a length of messages that can be sent in a remaining time based on the current time information and a start time of a next time-sensitive traffic flow; and generate the transmission control policy based on the length of messages that can be sent in the remaining time and a message length of the message attribute information.

17. The non-transitory computer-readable storage medium of claim 16, wherein generating the transmission control policy based on the length of messages that can be sent in the remaining time and the message length comprises:

determining, based on the length of messages that can be sent in the remaining time and the message length, whether the length of messages that can be sent in the remaining time is sufficient to send the current traffic flow to be sent;

sending the current traffic flow to be sent in response to the length of messages that can be sent in the remaining time being sufficient to send the current traffic flow to be sent; and repeatedly executing following steps until the length of the messages that can be sent in the remaining time is insufficient to send the current traffic flow to be sent:

re-acquiring current time information;

re-acquiring message attribute information of a current traffic flow to be sent;

calculating the length of messages that can be sent in the remaining time based on the current time information and a start time of a next time-sensitive traffic flow; and determining, based on the length of messages that can be sent in the remaining time and the message length, whether the length of messages that can be sent in the remaining time is sufficient to send the current traffic flow to be sent; and sending the current traffic flow to be sent in response to the length of messages that can be sent in the remaining time being sufficient to send the current traffic flow to be sent.

18. The non-transitory computer-readable storage medium of claim 16, wherein calculating a length of messages that can be sent in a remaining time based on the current time information and a start time of a next time-sensitive traffic flow comprises:

calculating the length of messages that can be sent in the remaining time based on the current time information, the start time of the next time-sensitive traffic flow, a transmission constraint parameter, and a first calculation formula as follows:

length of messages that can be sent in the remaining time=length of messages that can be sent corresponding to a difference between start time of the next time-sensitive traffic flow and the current time information−transmission constraint parameter.

19. The non-transitory computer-readable storage medium of claim 16, wherein prior to calculating a length of messages that can be sent in a remaining time based on the current time information and a start time of a next time-sensitive traffic flow, the computer-executable instruction which, when executed by the processor, cause the processor to:

look up a scheduling table for the start time of the next time-sensitive traffic flow.

20. The non-transitory computer-readable storage medium of claim 16, wherein generating the transmission control policy based on the length of messages that can be sent in the remaining time and the message length comprises:

determining, based on the length of messages that can be sent in the remaining time and the message length, whether the length of messages that can be sent in the remaining time is sufficient to send the current traffic flow to be sent; and generating a preemption control policy based on the length of messages that can be sent in the remaining time, the message length, and a preemption constraint condition parameter in response to the length of messages that can be sent in the remaining time being not sufficient to send the current traffic flow to be sent.

* * * * *